(12) United States Patent
Kawada et al.

(10) Patent No.: US 6,533,091 B1
(45) Date of Patent: Mar. 18, 2003

(54) SYNCHROMESH UNIT FOR TRANSMISSION

(75) Inventors: Tadashi Kawada, Saitama (JP);
Makoto Katagiri, Saitama (JP);
Susumu Saito, Saitama (JP); Hiroyuki Makino, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 98 days.

(21) Appl. No.: 09/702,848

(22) Filed: Nov. 1, 2000

(30) Foreign Application Priority Data

Nov. 1, 1999 (JP) .......................... 11-311541

(51) Int. Cl.$^7$ .............................................. F16D 11/00
(52) U.S. Cl. .................. 192/53.32; 192/53.36; 192/53.34
(58) Field of Search ................ 74/339, 333; 192/53.32, 192/53.34, 53.36

(56) References Cited

U.S. PATENT DOCUMENTS

| | | | |
|---|---|---|---|
| 3,700,083 A | | 10/1972 | Ashikawa et al. |
| 4,732,247 A | * | 3/1988 | Frost .................. 192/53.31 |
| 4,776,228 A | | 10/1988 | Razzacki et al. |
| 4,901,835 A | | 2/1990 | Frost |
| 5,678,670 A | * | 10/1997 | Olsson .................. 192/53.31 |
| 5,788,036 A | | 8/1998 | Soffa et al. |

FOREIGN PATENT DOCUMENTS

| | | |
|---|---|---|
| JP | 47-24054 | 7/1972 |
| JP | 48-24096 | 7/1973 |

OTHER PUBLICATIONS

Gscheidle, R., "Fachkunde Kraftfahrzeugtechnik", Verlag Europa–Lehmittel, p. 398 (1999).

* cited by examiner

Primary Examiner—Rodney H. Bonck
Assistant Examiner—Eric M Williams
(74) Attorney, Agent, or Firm—Arent Fox Kintner Plotkin & Kahn, PLLC (57) ABSTRACT

Spline teeth 66 formed in the inner periphery of a sleeve 45 slidably supported on a hub 63 fixed to a rotation shaft each comprise a projecting portion 66a constituted by a first inclined surface α, a flat surface γ and a second inclined surface β, and these projecting portions 66a bias a blocking ring via a synchro-spring 71 in an axial direction to thereby generte a synchronizing load between the sleeve 45 and a gear 37. Immediately before the projecting portions 66a of the spline teeth 66 of the sleeve 45 moving rightward mesh with dog teeth 37a of the gear 37, the second inclined surfaces β of the projecting portions 66a move and ride on the synchro-spring 71 so as to gradually reduce a pressing force axially applied to the blocking ring 67, thereby making it possible to provide a smooth mesh engagement between the spline teeth 66 of the sleeve 45 and the dog teeth 37a of the gear 37.

7 Claims, 10 Drawing Sheets

SYNCHROMESH UNIT FOR TRANSMISSION

BACKGROUND OF THE INVENTION

1. Field of the Invention

The present invention relates to a synchromesh unit for a transmission for locking a gear relatively rotatably supported on a rotation shaft to the rotation shaft via a sleeve adapted to move in axial directions.

2. Description of the Related Art

The synchromesh unit for a transmission is disclosed in JP-B-48-24096. In this synchromesh unit, a sleeve splined to a hub fixed to a rotation shaft of the transmission is moved in an axial direction so that a blocking ring is pressed radially inwardly by projecting portions of spline teeth formed internally or along the inner periphery of the sleeve via a synchro-spring to thereby bring a gear relatively rotatably supported on the rotation shaft into friction engagement with the blocking ring so as to rotate in a synchronized fashion. Thus, the spline teeth of the sleeve mesh with dog teeth of the blocking ring and those of the gear, so that the gear is locked to the rotation shaft.

In the synchromesh unit described in JP-B-48-24096, when the projecting portions formed on the spline teeth of the sleeve ride on and pass over the synchro-spring, a pressing force applied to the synchro-spring is lost momentarily and this generates a lag in synchronization due to drastic decrease in synchronizing load, resulting in a drawback that noise is generated when the spline teeth of the sleeve come into mesh engagement with the dog teeth of the gear.

To cope with this problem, as described in JP-B-47-24054, it is conceived that the projecting portion of the spline teeth of the sleeve are formed longer in an axial direction so that the pressing force continues to be applied to the synchrospring to thereby secure the synchronizing load for a long time, whereby the lag in synchronization can be prevented. In this construction, however, a strong synchronizing load remains between the sleeve and the gear momentarily the spline teeth of the sleeve are brought into mesh engagement with the dog teeth of the gear, and as a result of this, the relative rotation of the sleeve and the gear is restricted, which makes it difficult to align phases of the spline teeth and the dog teeth with each other, this causing a risk that the spline teeth cannot smoothly mesh with the dog teeth.

SUMMARY OF THE INVENTION

The present invention was made in view of these situations, and an object thereof is to provide a synchromesh unit for a transmission in which the spline teeth of the sleeve can smoothly mesh with the dog teeth of the gear.

With a view to attaining the aforesaid object, according to a first aspect of the invention, there is provided a synchromesh unit for a transmission comprising a gear having dog teeth in an outer periphery thereof and supported on a rotation shaft in such a manner as to rotate relative thereto, a hub locked to the rotation shaft, a sleeve axially slidably splined to the hub, a blocking ring having in an outer periphery thereof dog teeth adapted to mesh with spline teeth in an inner periphery of the sleeve and disposed between the hub and the gear in such a manner as to be brought into friction engagement with the gear, and a synchro-spring supported on an outer periphery of the blocking ring, wherein the blocking ring is pressed toward the gear with the synchro-spring by pressing the synchro-spring radially inwardly by projecting portions of the spline teeth in the inner periphery of the sleeve as the sleeve moves axially, and in a state in which the blocking ring is in friction engagement with the gear, the spline teeth in the inner periphery of the sleeve are caused to mesh with dog teeth of the blocking ring and the dog teeth of the gear, whereby the gear is locked to the rotation shaft, the synchromesh unit being characterized in that the projecting portions of the spline teeth of the sleeve each comprise a first inclined surface adapted to apply an axial load to the blocking ring via the synchro-spring as the sleeve moves axially and a second inclined surface adapted to release the axial load, whereby when the spline teeth in the inner periphery of the sleeve reach a position just before the spline teeth in the inner periphery of the sleeve mesh with the dog teeth of the gear after the spline teeth in the inner periphery of the sleeve mesh with the dog teeth of the blocking ring, the synchro-spring moves to ride on the second inclined surface.

According to the above construction, after the first inclined surfaces formed on the projecting portions of the spline teeth of the moving sleeve applies a load to the synchro-spring so as to synchronize the sleeve with the gear, when the spline teeth formed in the inner periphery of the sleeve mesh with the dog teeth formed in the outer periphery of the blocking ring while the spline teeth of the sleeve reach positions just before the spline teeth mesh with the dog teeth, the synchro-spring moves to ride on the second inclined surface to thereby gradually reduce the synchronizing load between the sleeve and the dog teeth of the gear. This avoids a risk that the synchronizing load is drastically removed immediately before the spline teeth of the sleeve mesh with the dog teeth of the gear, and therefore, an interference with smooth mesh engagement between the spline teeth and the dog teeth can be prevented which will result from the generation of a lag in synchronization between the sleeve and the gear. In addition, the residual excessive synchronizing load is eliminated momentarily the spline teeth of the sleeve mesh with the dog teeth of the gear, and therefore, a relative rotation between the sleeve and the gear is permitted to thereby absorb a lag in phase between the spline teeth and the dog teeth, thereby making it possible to provide a smooth mesh engagement between the spline teeth and the dog teeth.

According to a second aspect of the invention, there is provided a synchromesh unit for a transmission as set forth in the first aspect of the invention, wherein the projecting portions of the spline teeth of the sleeve each has a flat surface extending axially between the first inclined surface and the second inclined surface.

According to the above construction, the flat surfaces are formed between the first inclined surfaces and the second inclined surfaces on the projecting portions of the spline teeth, and therefore, a positive shift feeling can be obtained by the reaction force of the load applied to the synchro-spring by the flat surface in shifting gears, whereby the shift feeling can be improved.

DETAILED DESCRIPTION OF THE PREFERRED EMBODIMENTS

A mode for carrying out the invention will be described below with reference to embodiments illustrated in the accompanying drawings.

Figure 1:
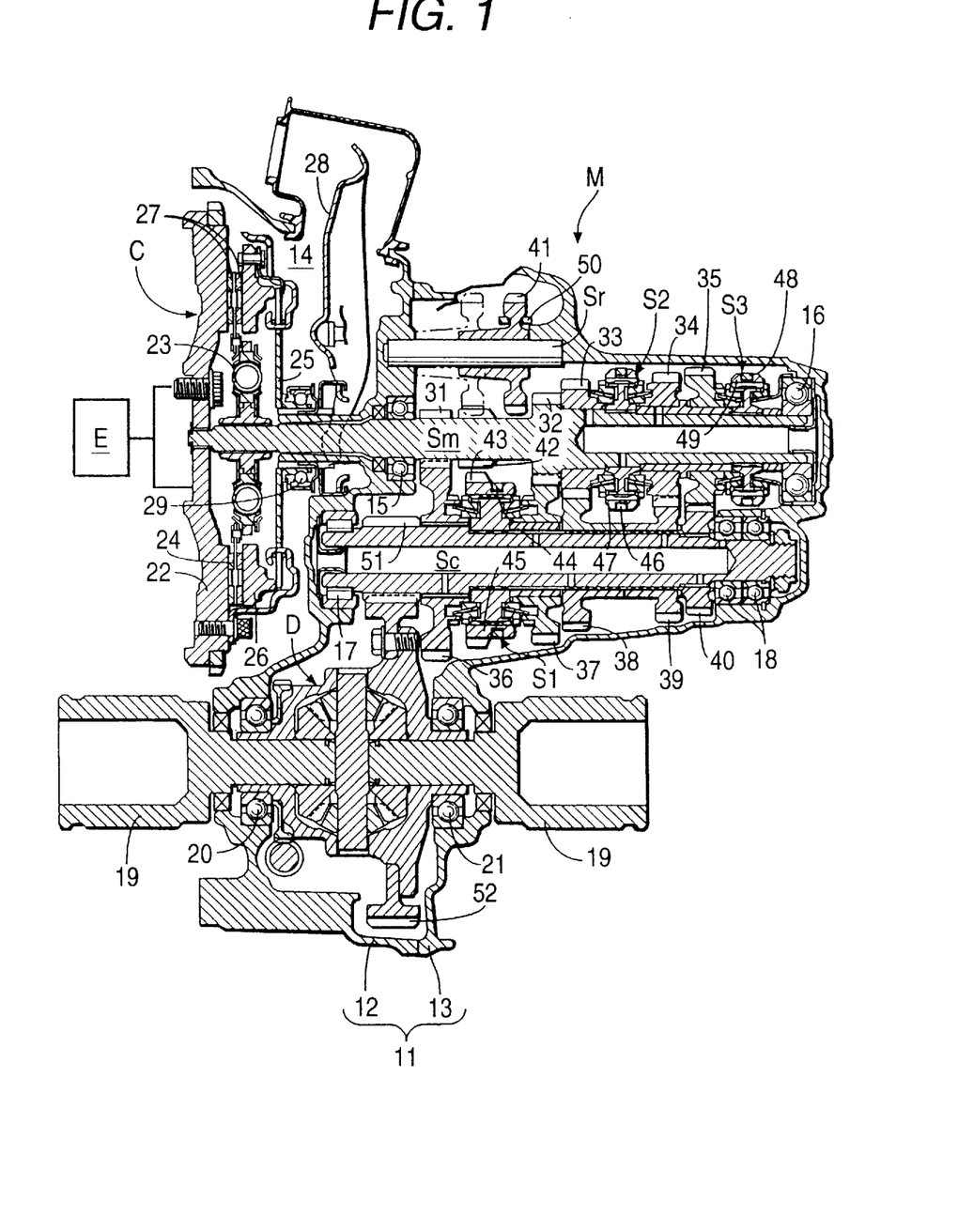
FIG. 1 is a longitudinal sectional view of a vehicle manual transmission.

As shown in FIG. 1, a transmission case 11 for a vehicle manual transmission M having five forward speeds and one reverse speed comprises a left case half body 12 and a right case half body 13 which are divided by a dividing plane extending in a longitudinal direction of the vehicle. A gear shifting clutch C is accommodated in a clutch chamber 14 formed in a side of the left half body 12 which is located on an engine E side. A main shaft Sm connected to the engine E via the gear shifting clutch C is supported at left and right ends thereof by ball bearings 15, 16 on the left case half body and the right case half body, respectively. Additionally, a countershaft Sc disposed in parallel with the main shaft 12 is supported at left and right end portions by ball a roller bearing 17 and. ball bearings 18, 18 on the left half and the right case, respectively. A differential D for distributing the output of the countershaft Sc to left and right axles 19, 19 is supported on the left case half body 12 and the right case half body 13 via a pair of left and right ball bearings 20, 21.

The gear shifting clutch C accommodated in the clutch chamber 14 comprises a clutch wheel 22 connected to a right end of the crankshaft 11 of the engine E and a clutch disc 24 connected to a left end of the main shaft Sm via a damper 23, and they are normally in engagement with each other by pressure sandwiching a facing 27 of the clutch disk 24 between a pressure plate 26 and the clutch wheel 22 using a springing force of a diaphragm spring 25, and the engagement is released by pressing a release bearing 29 in a left direction with a variable release fork 28 in shifting gears.

A main first-speed gear 31 and a main second-speed gear 32 are fixedly provided on the main shaft Sm, and a main third-speed gear 33, a main fourth-speed gear 34 and a main fifth speed gear 35 are supported on the main shaft Sm in such a manner as to rotate relative to the shaft. On the other hand, a counter first-speed gear 36 and a counter second-gear 37 which mesh with the main first-speed gear 31 and the main second-speed gear 32, respectively, are supported on a countershaft Sc in such a manner as to rotate relatively to the countershaft, while a counter third-speed gear 38, a counter fourth-speed gear 39 and a counter fifth-speed gear 40 which mesh with the main third-speed gear 33, the main fourth-speed gear 34 and the main fifth-speed gear 35, respectively, are fixedly provided on the countershaft Sc.

A reverse idler shaft Sr is supported on the left case half body 12 and the right case half body 13 at left and right ends thereof, and a reverse idler gear 41 supported on this reverse idler shaft Sr in such a manner as to slide in longitudinal directions can mesh with a main reverse gear 42 fixedly provided on the main shaft Sm, as well as a counter reverse gear 43 supported on the countershaft Sc in such a manner as to rotate relatively to the countershaft Sc.

When a sleeve 45 of a first-second synchromesh unit S1 is moved leftward with a first-second shift fork 44, the counter first-speed gear 36 is locked to the countershaft Sc, whereby a synchromesh engagement of the first-speed gear is established, and when the sleeve 45 of the first-speed synchromesh unit S1 is moved rightward with the first-second shift fork 44, the counter second gear 37 is locked to the countershaft Sc, whereby a synchromesh engagement of the second-speed gear is established. When a sleeve 47 of a third-fourth synchromesh unit S2 is moved leftward with a third-fourth shift fork 46, the main third-speed gear 33 is locked to the main shaft Sc, whereby a synchromesh engagement of the third-speed gear is established, and when the sleeve 47 of the third-fourth synchromesh unit S2 is moved rightward with the third-fourth shift fork 46, the main fourth-speed gear 34 is locked to the main shaft Sm, whereby a synchromesh engagement of the fourth-speed gear is established.

When a sleeve 49 of a fifth-speed synchromesh unit S3 is moved leftward with a fifth-speed shift fork 48, the main fifth-speed gear 35 is locked to the main shaft Sm, whereby a synchromesh engagement of the fifth-speed gear is established. When the sleeve 49 of the fifth-speed synchromesh unit S3 is moved rightward with the fifth-speed shift fork 48, a reverse shift fork 50 rotatably holding the reverse idler gear 41 interlocks with the fifth-speed shift fork 48 and moves leftward, and the reverse idler gear 41 meshes with the main reverse gear 42 and the counter reverse gear 43 provided on the sleeve 45 of the first-second synchromesh unit S1, whereby a synchromesh engagement of the reverse gear is established.

When synchromesh engagements of the first-speed to fifth-speed gears are established as described above, rotation of the countershaft Sc is transmitted to the differential gear D via a final drive gear 51 and a final driven gear 52, whereby the left and right axles 19, 19 are driven.

Next, referring to FIGS. 2 to 5, the construction of the first-second synchromesh units S1 will be described. Since the first-second synchromesh unit S1 is provided with a first-speed synchromesh mechanism and a second synchromesh mechanism which are of substantially the same construction in a transversely symmetrical fashion, the right-hand side second-speed synchromesh mechanism will mainly be described as representing the two mechanisms. Note that reference numerals like to those given to constituent elements of the right-hand side second-speed synchromesh mechanism are given to like constituent components of the left-hand side first-speed synchromesh mechanism. Note also that the constructions of the third-fourth synchromesh unit S2 and the fifth-speed synchromesh unit S3 are substantially the same as that of the first-second synchromesh unit S1.

The second-speed synchromesh mechanism is intended to lock the counter second-speed gear 37 relatively rotatably supported on the outer periphery of the countershaft Sc via a collar 61 and a needle bearing 62 to the countershaft Sc and comprises a sleeve 43 which is axially slidably splined to the outer periphery of an annular hub 63 splined in turn to the countershaft Sc. The sleeve 43 is transversely driven from a neutral position shown in FIG. 2 with the first-second shift fork 44, wherein moving to a left-hand side first-speed position, the sleeve 43 establishes a synchromesh engagement of the first-speed gear, while moving to a right-hand side second-speed position, the sleeve 43 establishes a synchromesh engagement of the second-speed gear.

Figure 2:
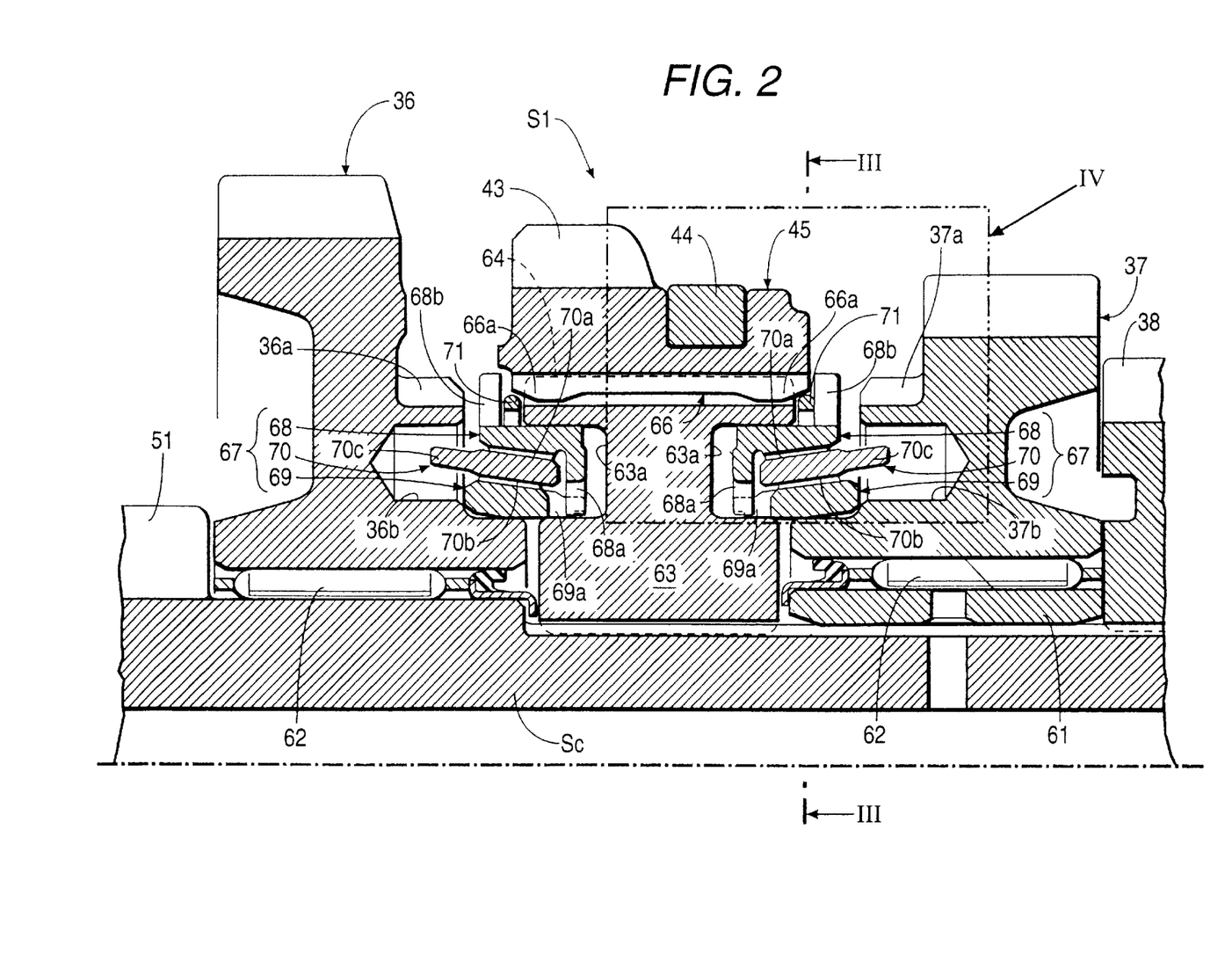
FIG. 2 is an enlarged view of a 1-2 synchromesh unit.
Figure 3:
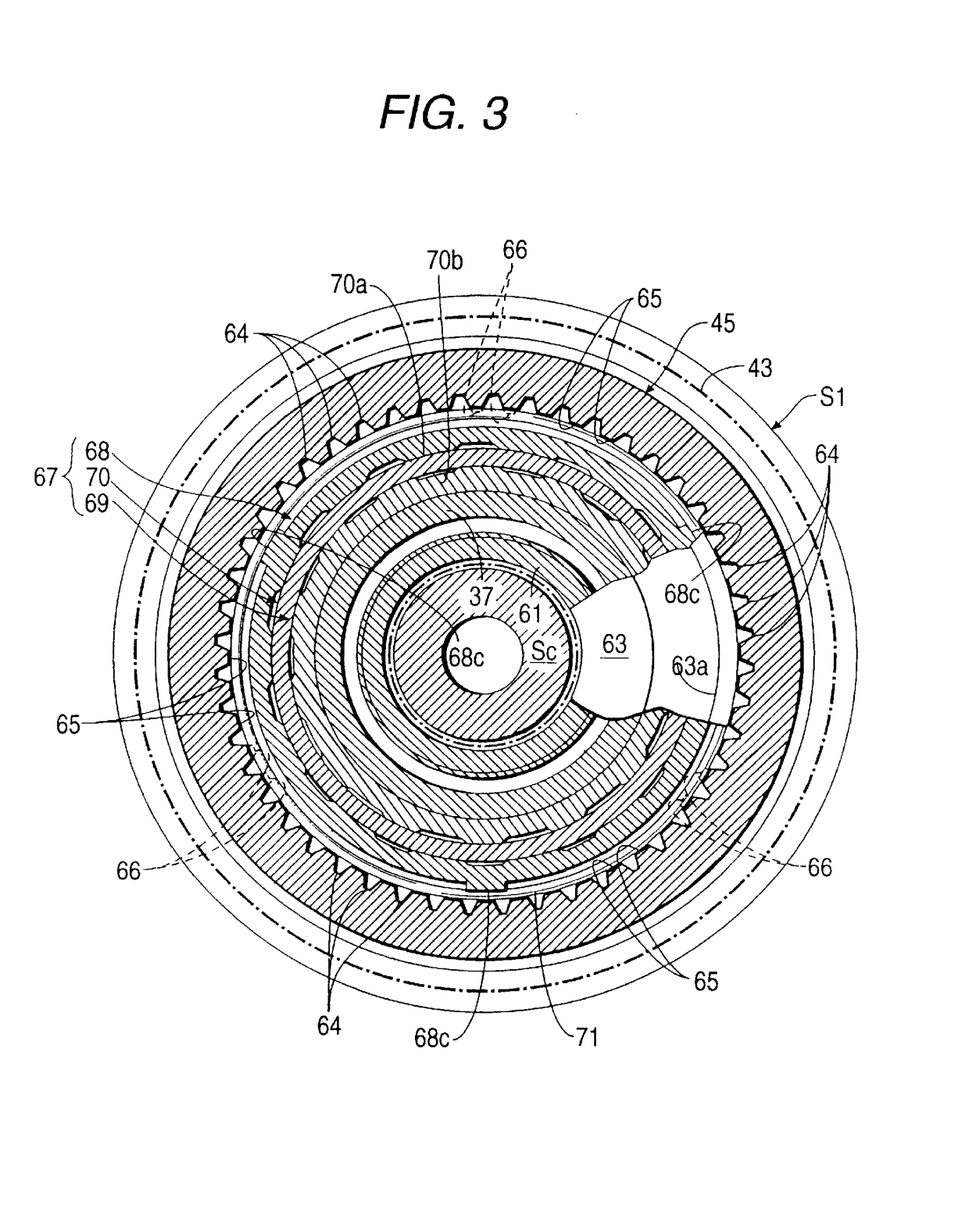
FIG. 3 is a cross-sectional view taken along the line III—III of FIG. 2.

Spline teeth 64 are formed in the outer periphery of the hub 63, and there are two types of spline teeth 65, 66 formed in the inner periphery of the sleeve 45 for meshing engagement with the spline teeth 64 of the hub 63. Namely, the majority of spline teeth 65 are cut straight and have linear top surfaces, while a total of six spline teeth 66 are formed such that two spline teeth are disposed at each of three positions which are spaced away from each other 120 degrees around the axial center of the countershaft Sc as a center thereof and radially inwardly projecting projecting portions 66a are formed on both axial end portions of the spline teeth.

A blocking ring 67 is disposed in an annular recessed portion 63a formed in sides of the hub 63. The blocking ring 67 comprises an outer ring 68 disposed radially outwardly, an inner ring 69 disposed radially inwardly and a tapered cone 70 sandwiched between the outer ring 68 and the inner ring 69. The outer ring 68 and the inner ring 69 are locked to each other such that they cannot rotate relatively through engagement between a locking pawl 68a formed on the outer ring 68 and a locking pawl 69a formed on the inner ring 69. The tapered cone 70 has radially outward and inward tapered surfaces 70a, 70b, the radially outward tapered surface 70a being brought into slidable contact with the inner peripheral surface of the outer ring. 68, while the radially inward tapered surface 70b is brought into slidable contact with the outer peripheral surface of the inner ring 69.

A plurality of dog teeth 68b are formed at an axially outward end of the outer ring 68 in such a manner as to protrude radially outwardly, and dog teeth 37a are formed at an end portion of the counter second-speed gear 37 which faces the dog teeth 68b. When the sleeve 45 moves rightward in FIG. 2, the spline teeth 66 of the sleeve 45 are able to mesh with the dog teeth 68b of the outer ring 68 and the dog teeth 37a of the counter second-speed gear 37. Similarly, when the sleeve 45 moves leftward in FIG. 2, the spline teeth 66 of the sleeve 45 are able to mesh with the dog teeth 68b of the outer ring 68 and dog teeth 36a of the counter first-speed gear 36.

Spring support portions 68c (refer to FIG. 3) are formed at three positions around the outer diameter of the outer ring 68 which are spaced away from each other 120 degrees, and an annular synchro-spring 71 is supported on these spring support portions 68c. When the sleeve 45 is at the neutral position, the synchro-spring 71 is located at a position which is surrounded by the dog teeth 68a of the outer ring 68, the axial end face of the hub 63 and the axial end portions of the spline teeth 66 (refer to FIG. 4). Additionally, a projecting portion 70c protruding from the axially outward end of the tapered cone 70 is brought into loose engagement with a recessed portion 37b formed in a side of the counter second-speed gear 37 (and a recessed portion 36b formed in a side of the counter first-speed gear 36).

Note that the outer ring 68 can relatively rotate half a pitch of the dog tooth 68 by allowing the three spring support portions 68c protruding from the outer periphery of the outer ring 68 to engage into recessed portions (not shown) formed in the hub 63.

Figure 4:
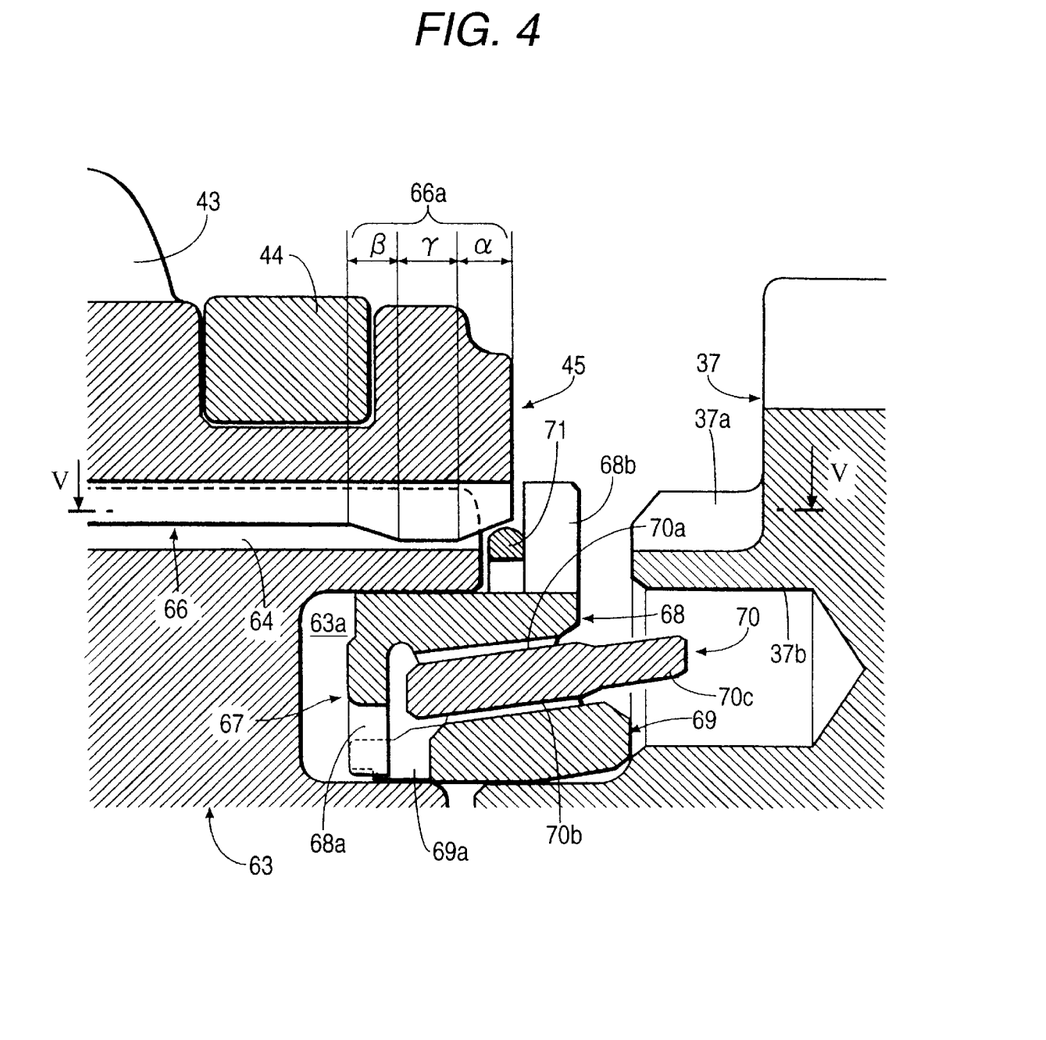
FIG. 4 is an enlarged view of a portion indicated by reference numeral IV in FIG. 2.

As is clear from FIG. 4, the projecting portions 66a formed at the axial end portions of the internal spline teeth 66 of the sleeve 45 are each provided with a first inclined surface $\alpha$, a flat surface $\beta$ and a second inclined surface $\gamma$, and the inside diameters of the first inclined surface $\alpha$ and the second inclined surface $\beta$ which extend from, respectively, the ends of the flat surface $\gamma$ whose inside diameter is constant increase as they extend away from the flat surface $\gamma$. An axial distance resulting from addition of the length of the first inclined surface $\alpha$ and the length of the flat surface $\gamma$ is equal to an axial distance from an apex of the synchro-spring 71 to the end portion of the dog tooth 37a of the counter second-speed gear 37, the former being set slightly shorter.

Figure 5:
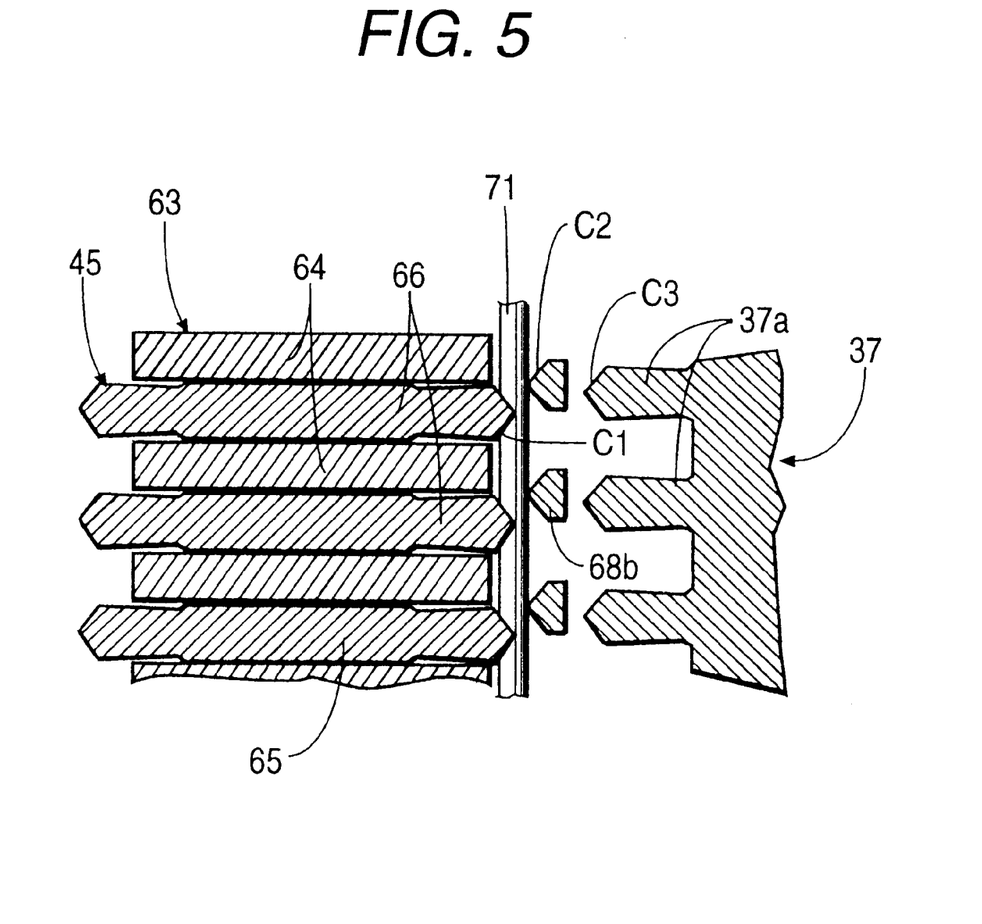
FIG. 5 is a sectional view taken along the line V—V of FIG. 2.

As is clear from FIG. 5, a tapered chamfers C1 are formed on the axial ends of the internal spline teeth 66 of the sleeve 45, and chamfers C2, C3 are formed on the dog teeth 68b of the outer ring 68 and the dog teeth 37a of the counter second-speed gear 37, which are respectively tapered in an opposite direction to the chamfers Cl of the spline teeth 66.

Next, an operation of the embodiment constructed as described above of the invention will be described.

As shown in FIGS. 4 and 5, when the sleeve 45 is at the neutral position, the first inclined surfaces $\alpha$ of the projecting portions 66a of the internal spline teeth 66 of the sleeve 45 are not in contact with the synchro-spring 71, and therefore, the blocking ring 67 to which no load is applied from the synchro-spring 71 is in such a state where the tapered cone 70 can free rotate relative to the outer ring 68 and the inner ring 69. Therefore, the upper ring 68 and the lower ring 69 of the blocking ring 67 rotate together with the hub 63, and the tapered cone 70 rotate together with the counter second-speed gear 37, whereby there is generated no synchronizing action between the sleeve 45 and the counter second-speed gear 37.

Figure 6:
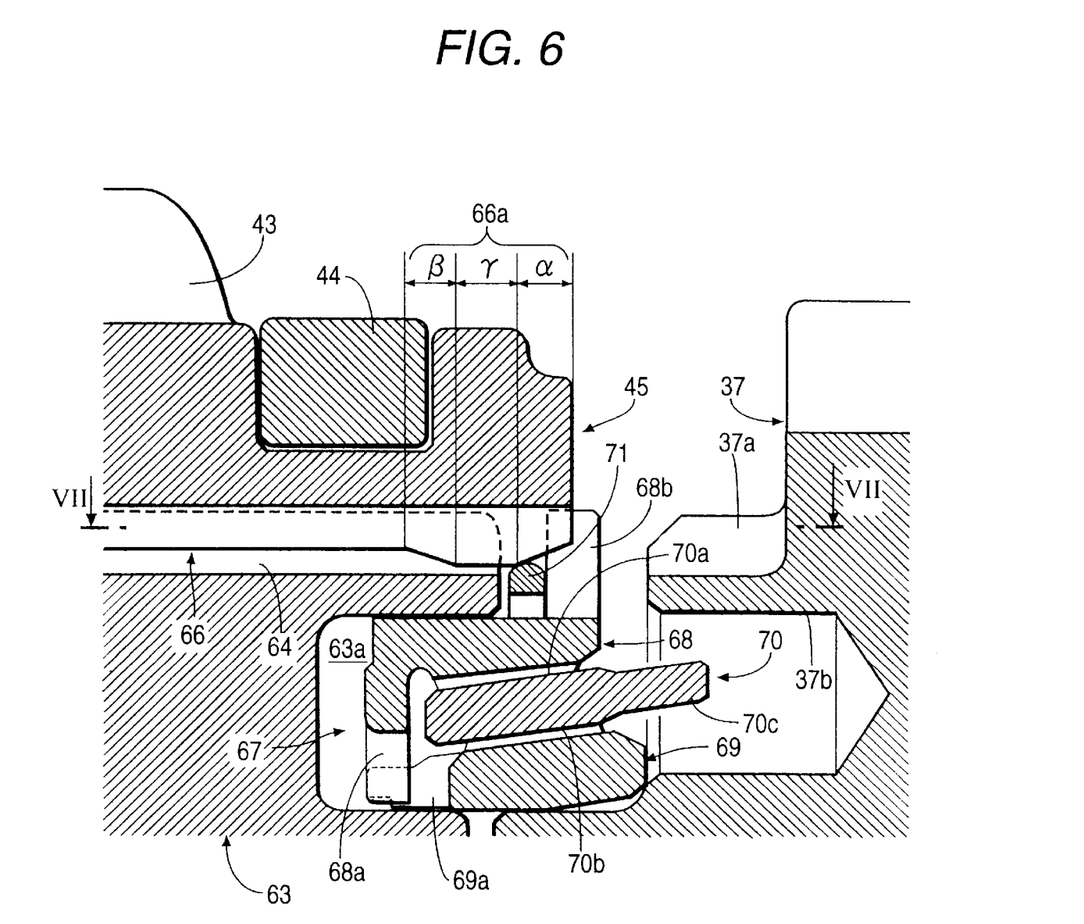
FIG. 6 is a diagram explaining an operation performed in an earlier stage of establishing a synchromesh engagement of a second-speed gear.
Figure 7:
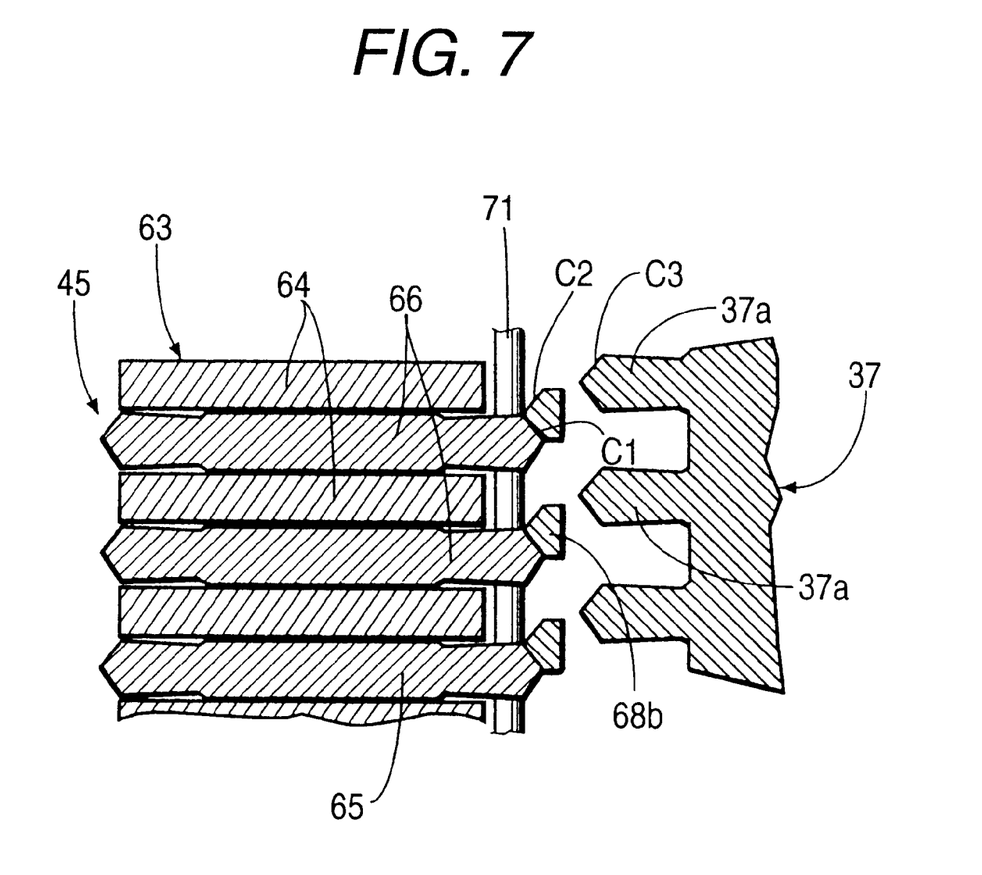
FIG. 7 is a sectional view taken along the line VII—VII of FIG. 6.

As shown in FIGS. 6 and 7, when the sleeve 45 is moved rightward relative to the hub 63 in order to establish a synchromesh engagement of the second-speed gear, the first inclined surfaces $\alpha$ of the projecting portions 66a of the internal spline teeth 66 of the sleeve 45 press against the three circumferential positions of the synchro-spring 71 radially inwardly. Then, the synchro-spring 71 receives an axially rightward load resulting from a friction force generated with the projecting portions 66a and biases the outer ring 68 of the blocking ring 67 rightward toward the counter second-speed gear 37, whereby the tapered cone 70 is sandwiched between the outer ring 68 and the inner ring 69, this generating a frictional force between the tapered surfaces 70a, 70b of the tapered cone 70 and the outer ring 68 and the inner ring 69, respectively.

Simultaneously with this, the chamfers C1 at the distal ends of the spline teeth 66 are pressed by the chamfers C2 of the dog teeth 68b of the outer ring 68, whereby the sleeve 45 and the outer ring 68 slightly rotate relative to each other, and a large frictional force is generated between the tapered surfaces 70a, 70b of the tapered cone 70 and the outer ring 68 and the inner ring 69, respectively, due to an axial load generated between the chamfers C1, C2. As a result of this, the tapered cone 70 of the blocking ring 67 is integrated into the sleeve 45 by virtue of the frictional force, whereby the rotation of the counter second-speed gear 37 which is in engagement with the projecting portion 70c of this tapered cone 70 at the recessed portion 37b thereof synchronizes with the rotation of the sleeve 45.

When the sleeve 45 moves rightward further, the engagement between the chamfers C1 of the spline teeth 66 and the chamfers C2 of the dog teeth 68b of the outer ring 68 is released, and the spline teeth 66 and the dog teeth 68b perfectly mesh with each other, and since the axial load applied through engagement of the chamfers C1, C2 is removed, the frictional force acting on the tapered surfaces 70a, 70b of the tapered cone 70 is reduced. However, even while the above is happening, the flat surfaces γ of the projecting portions 66a of the spline teeth 66 still press against the synchro-spring 71, and therefore, the axial load is given to the outer ring 68 by the synchr-spring 71 through the axial frictional force between the flat surface γ and the synchro-spring 71, whereby the frictional force acting on the tapered surfaces 70a, 70b of the tapered cone 70 is secured by the load so acting, thus a lag in synchronization between the counter second-speed gear 37 and the sleeve 45 is prevented from happening.

Figure 8:
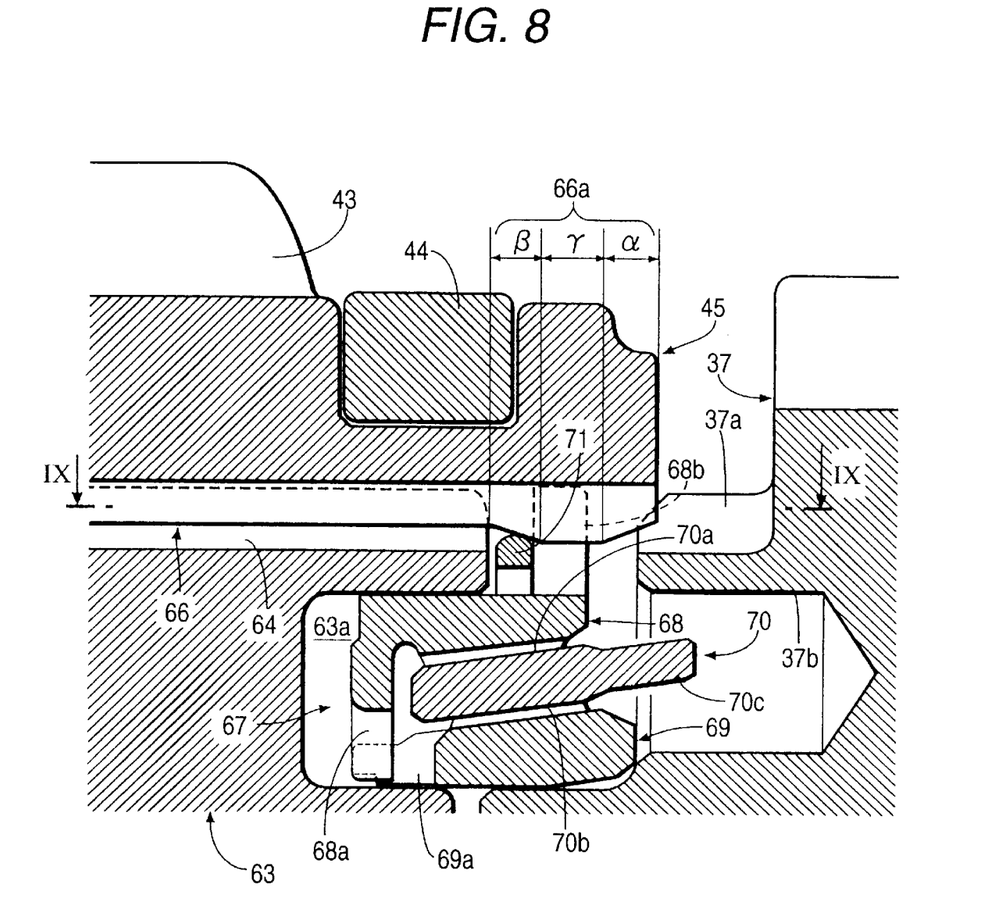
FIG. 8 is a diagram explaining an operation performed in a later stage of establishing a synchromesh engagement of the second-speed gear.
Figure 9:
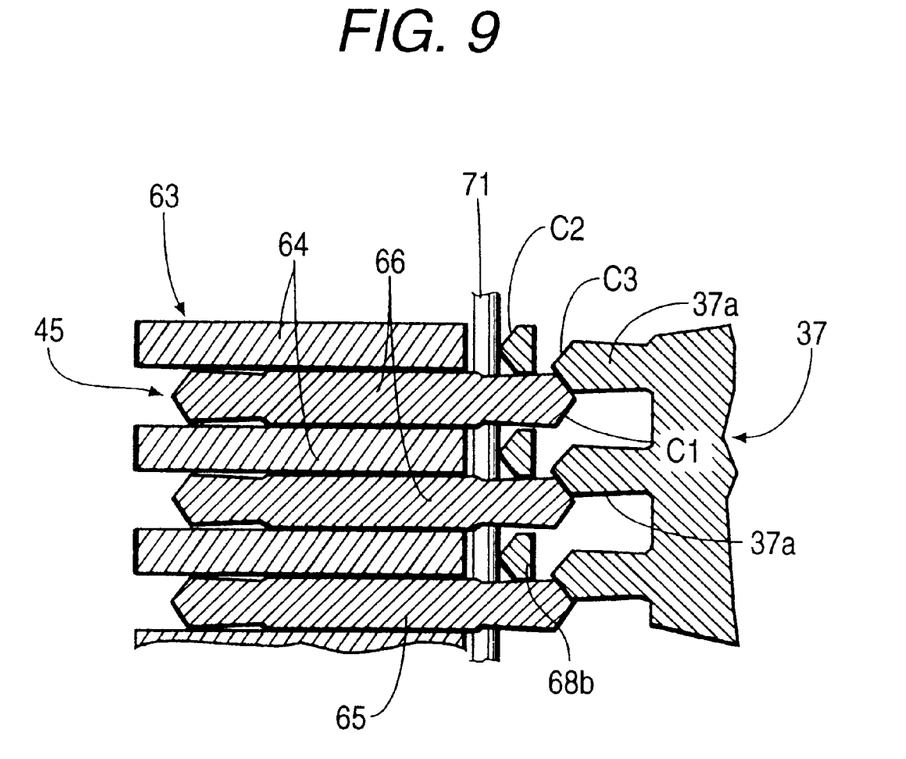
FIG. 9 is a sectional view taken along the line IX—IX of FIG. 8.

As shown in FIGS. 8 and 9, when the sleeve 45 moves rightward still further, the chamfers C1 of the spline teeth 66 engage the chamfers C3 of the dog teeth 37a of the counter second-speed gear 37, and a wedge effect produced through the engagement causes the sleeve 45 and the counter second-speed gear 37 to rotate slightly relative to each other, whereby the spline teeth 66 of the sleeve 45 mesh with the dog teeth 37a of the counter second-speed gear 37 to thereby establish the synchromesh engagement of the second-speed gear.

Since the second inclined surfaces β of the projecting portions 66a of the spline teeth 66 move to ride on the synchro-spring 71 immediately before the chamfers C1 of the spline teeth 66 engage with the chamfers C3 of the dog teeth 37a of the counter second-speed gear 37, the load applied to the synchro-spring 71 by the spline teeth 66 is reduced, whereby the frictional force acting on the tapered surfaces 70a, 70b of the tapered cone 70 is in turn reduced. As a result of this, the load is reduced which acts to synchronize the sleeve 45 and the counter second-speed gear 37, whereby the sleeve 45 and the counter second-speed gear 37 are caused to smoothly rotate relative to each other through the wedge action through the contact between the chamfers C1, C3, thereby making it possible to provide a secure mesh engagement between the spline teeth 66 of the sleeve 45 and the dog teeth 37a of the counter second-speed gear 37.

Additionally, in the event that there is provided no second inclined surface β following the flat surface γ, as soon as the synchro-spring 71 is disengaged from the flat surface γ, the load applied radially inwardly to the synchro-spring 71 is removed, and the synchronizing load is drastically reduced. Therefore, in particular, in a case where a gear shift is performed slowly, a synchronizing action is lost from the load applied radially inwardly to the synchro-spring 71 is removed before the chamfers C1 of the spline teeth 66 of the sleeve 45 mesh with the chamfers C3 of the dog teeth 37a of the counter second-speed gear 37, whereby a smooth mesh engagement cannot be-provided between the spline teeth 66 and the dog teeth 37a.

According to the present invention, however, the load radially inwardly applied to the synchro-spring 71 is modestly reduced by the second inclined surface β following the flat surface γ, and therefore, there is no risk of the synchronizing load being removed immediately, whereby even if the gear shift operation is performed slowly, the spline teeth 66 of the sleeve 45 can be smoothly brought into mesh engagement with the dog teeth 37a of the counter second-speed gear 37.

Note that when the sleeve 45 moves leftward back to the neutral position after the established synchromesh engagement of the second-speed gear is released, the synchro-spring 71 can smoothly be guided onto the flat surface γ through the action of the second inclined surface β.

Figure 10:
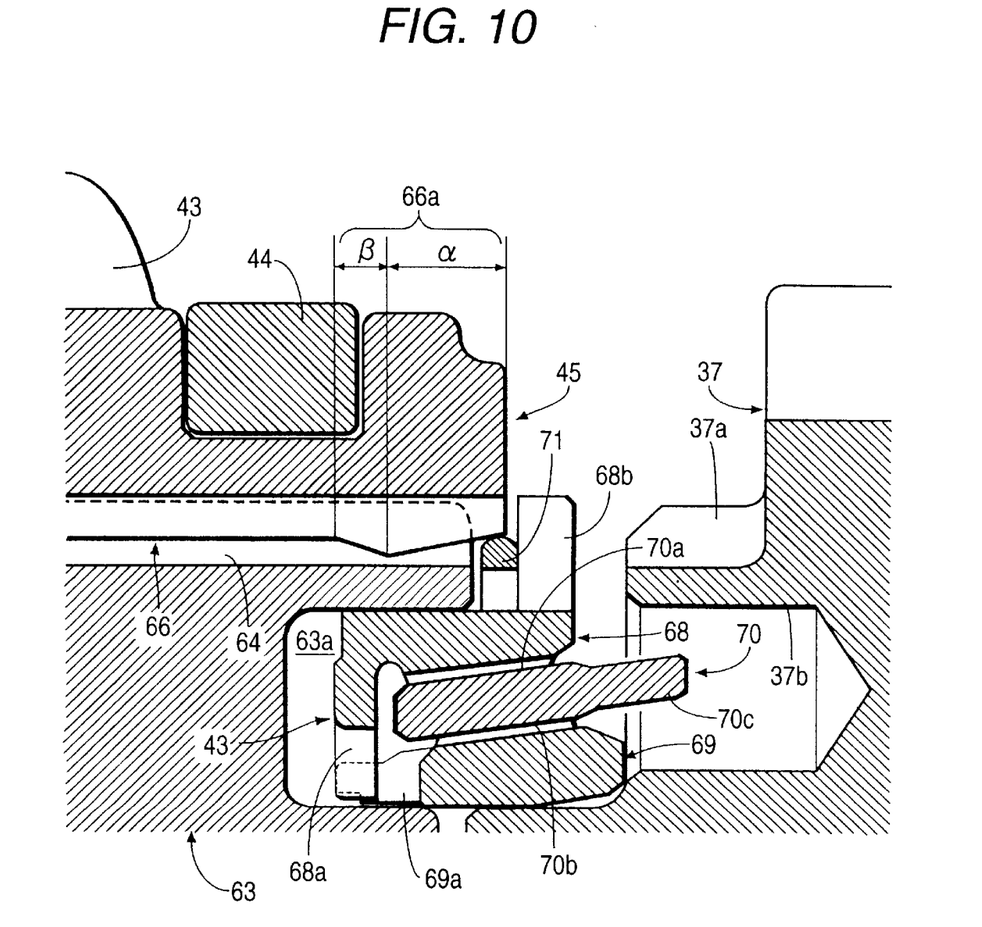
FIG. 10 is a diagram showing a second embodiment according to the invention which corresponds to the sectional view shown in FIG. 5.

Next, a second embodiment of the invention will be described with reference to FIG. 10.

In the second embodiment, the configuration of the projecting portions 66a of the spline teeth 66 of the sleeve 45 is different from that used in the first embodiment. Namely, while the projecting portion 66a of the first embodiment comprises the flat surface γ between the first inclined surface α and the second inclined surface β, a projecting portion 66a of the second embodiment is not provided with the flat surface γ, and a first inclined surface α is directly contiguous with a second inclined surface β. Then, when the sleeve 45 moves rightward to establish a synchromesh engagement of the second-speed gear, immediately before chamfers C1 of the spline teeth 66 of the sleeve 45 engage with chamfers C3 of dog teeth 37 of a counter second-speed gear 37, the second inclined surface β moves to ride on a synchro-spring 71 so as to reduce a load acting to press against the synchro-spring 71 radially inwardly.

This gradually reduces the frictional force acting on tapered surfaces 70a, 70b of a tapered cone 70 of a blocking ring 67 when the sleeve 45 and the counter second-speed gear 37 are caused to rotate relative to each other through a wedge action resulting when the chamfers C1, C3 are brought into engagement with each other, whereby the synchronizing load on the sleeve 45 and the counter second-speed gear 37 can slowly be reduced so as to facilitate the relative rotation thereof, thereby making it possible to provide a smooth mesh engagement between the spline teeth 66 of the sleeve 45 and the counter second-speed gear 37.

However, as in the case of the first embodiment, provision of the flat surface γ between the first inclined surface α and the second inclined surface β can provide a driver with a more positive shift feeling due to the reaction force of a load applied to the synchro-spring 71 by the flat surface when the sleeve 45 moves than a case otherwise, whereby the shift feeling the driver can senses can be improved further.

Thus, while the embodiments of the invention have been described heretofore, the invention permits various modifications in design without departing from the scope and sprit of the invention.

For example, while the synchromesh unit is illustrated in the embodiments which comprises the three members such as the outer ring 68, the inner ring 69 and the tapered cone 70, the present invention can be applied to a synchromesh unit comprising a blocking ring constituted by a single member which is adapted to be brought into engagement with a gear via a tapered surface.

Thus, according to the first aspect of the invention, after the first inclined surfaces formed on the projecting portions of the spline teeth of the moving sleeve applies a load to the synchro-spring so as to synchronize the sleeve with the gear, when the spline teeth formed in the inner periphery of the sleeve mesh with the dog teeth formed in the outer periphery of the blocking ring while the spline teeth of the sleeve reach positions just before the spline teeth mesh with the dog teeth, the synchro-spring moves to ride on the second inclined surface to thereby gradually reduce the synchronizing load between the sleeve and the dog teeth of the gear. This avoids a risk that the synchronizing load is drastically removed immediately before the spline teeth of the sleeve mesh with the dog teeth of the gear, and therefore, an interference with smooth mesh engagement between the spline teeth and the dogteeth can be prevented which will result from the generation of a lag in synchronization between the sleeve and the gear. In addition, the residual excessive synchronizing load is eliminated momentarily the spline teeth of the sleeve mesh with the dog teeth of the gear, and therefore, a relative rotation between the sleeve and the gear is permitted to thereby absorb a lag in phase between the spline teeth and the dog teeth, thereby making it possible to provide a smooth mesh engagement between the spline teeth and the dog teeth.

According to the second aspect of the invention, the flat surfaces are formed between the first inclined surfaces and the second inclined surfaces on the projecting portions of the spline teeth, and therefore, a positive shift feeling can be obtained by the reaction force of the load applied to the synchro-spring by the flat surface in shifting gears, whereby the shift feeling can be improved.

What is claimed is:

1. A synchromesh unit for a transmission, comprising:
   a rotation shaft;
   a gear supported on said rotation shaft such as to be rotatable relative thereto, said gear having dog teeth in an outer periphery thereof;
   a hub locked to said rotation shaft;
   a sleeve axially slidably splined to said hub;
   a blocking ring disposed between said hub and said gear in such a manner as to be brought into friction engagement with said gear, said blocking ring having in an outer periphery thereof dog teeth adapted to mesh with spline teeth in an inner periphery of said sleeve; and
   a synchro-spring supported on an outer periphery of said blocking ring,
   wherein said blocking ring is pressed toward said gear with said synchro-spring by pressing said synchro-spring radially inwardly by projecting portions of said spline teeth in the inner periphery of said sleeve in conjunction with an axial movement of said sleeve, and in a state in which said blocking ring is in friction engagement with said gear, said spline teeth in the inner periphery of said sleeve are caused to mesh with dog teeth of said blocking ring and said dog teeth of said gear, whereby said gear is locked to said rotation shaft,
   said projection portions of said spline teeth of said sleeve each comprise a first inclined surface adapted to apply an axial load to said blocking ring via said synchro-spring in conjunction with the axial movement of said sleeve and a second inclined surface adapted to release said axial load, such that
   an axial distance between the gear side end of said first inclined surface and the gear side end of said second inclined surface is substantially equal to or slightly shorter than an axial distance between an end portion of said dog teeth of said gear and an apex of said synchro spring such that said synchro-spring is guided by said second inclined surface when said spline teeth in the inner periphery of said sleeve reach a position just before said spline teeth in the inner periphery of said sleeve mesh with said dog teeth of said gear after said spline teeth in the inner periphery of said sleeve mesh with said dog teeth of said blocking ring.

2. The synchromesh unit for a transmission as set forth in claim 1, wherein said projecting portions of said spline teeth of said sleeve each has a flat surface extending axially between said first inclined surface and said second inclined surface.

3. The synchromesh unit for a transmission as set forth in claim 2,
   wherein each of said projecting portions of said spline teeth of said sleeve has a flat surface extending axially between said first inclined surface and said second inclined surface.

4. The synchromesh unit for a transmission as set forth in claim 1,
   wherein each of said projecting portions of said spline teeth of said sleeve has a flat surface extending axially between said first inclined surface and said second inclined surface.

5. The synchromesh unit for a transmission as set forth in claim 4, wherein each of said projecting portions of said spline teeth of said sleeve has a flat surface extending axially between said first inclined surface and said second inclined surface.

6. The synchromesh unit for a transmission as set forth in claim 4, wherein said synchro-spring is disposed between said dog teeth of said blocking ring and said hub in an axial direction of said rotation shaft.

7. The synchromesh unit for a transmission as set forth in claim 4, wherein said blocking ring comprises:
   an outer ring having said dog teeth in an outer periphery thereof;
   an inner ring disposed radially inwardly of said outer ring, said inner ring engaged with said outer ring so as to prevent the relative rotation to each other; and
   a tapered core disposed radially between said outer ring and said inner ring wuch that tapered surfaces of said tapered core are frictionally contactable with an inner peripheral surface of said outer ring and an outer peripheral surface of said inner ring.

* * * * *